Patented Nov. 21, 1944

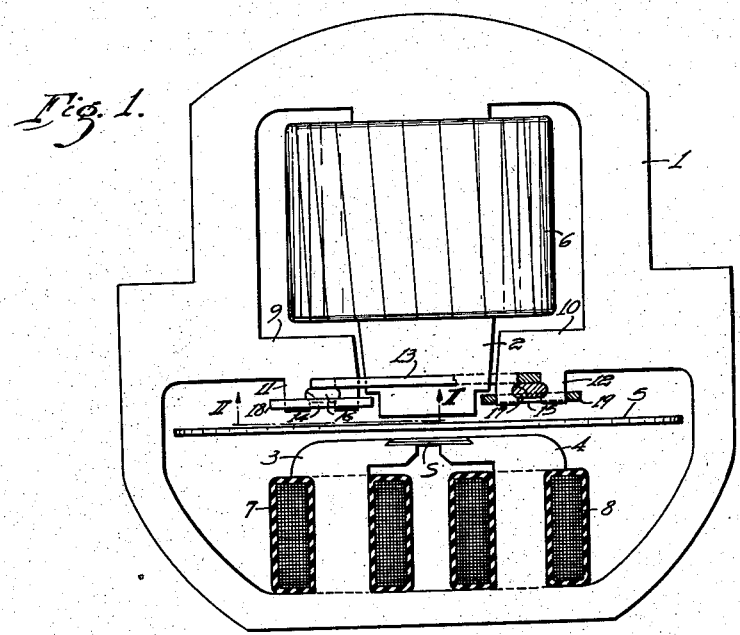

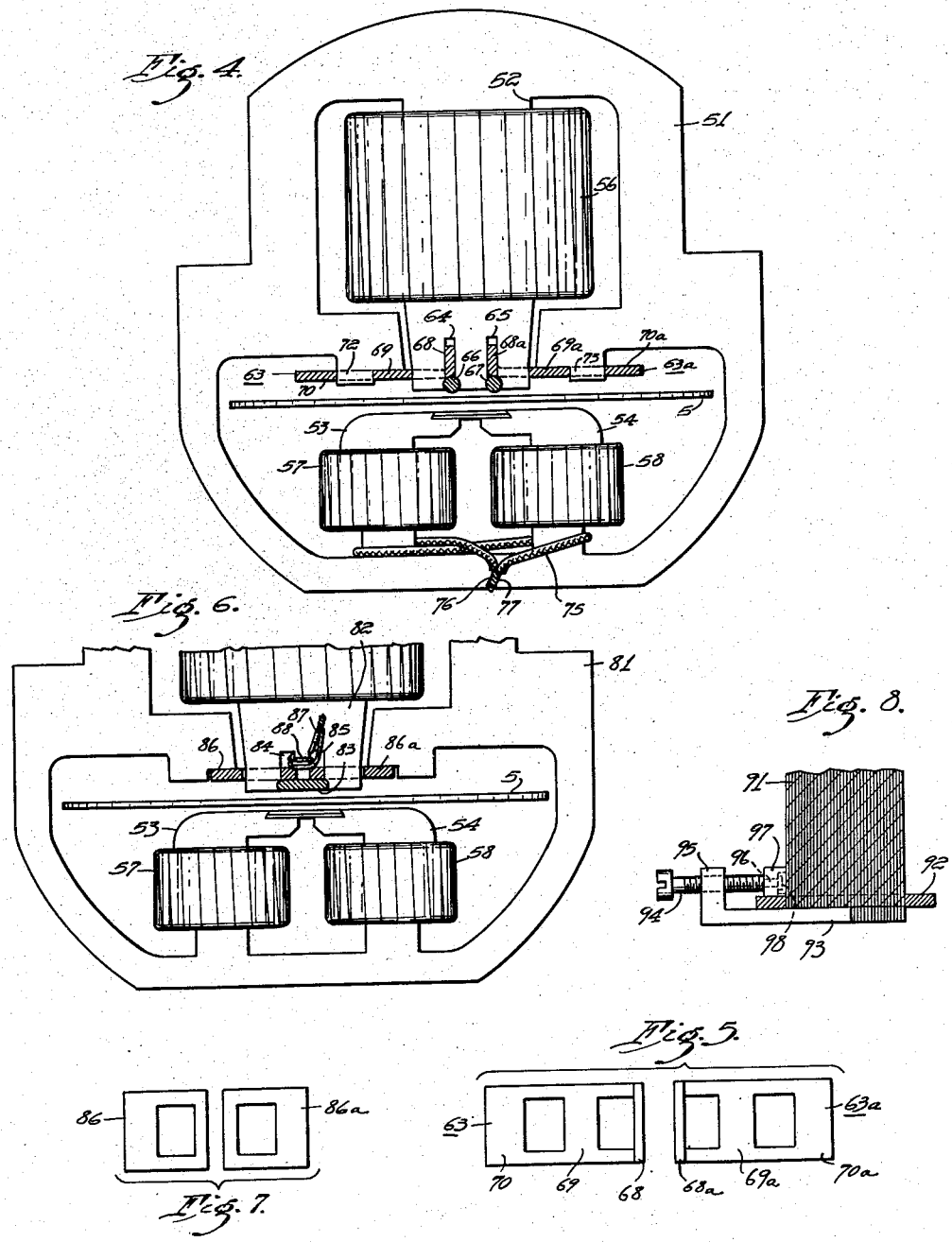

2,363,284

UNITED STATES PATENT OFFICE 2,363,284

WATTHOUR METER

Thomas D. Barnes, West Orange, N. J., assignor to Westinghouse Electric & Manufacturing Company, East Pittsburgh, Pa., a corporation of Pennsylvania Application September 26, 1941, Serial No. 412,393

17 Claims. (Cl. 171—34)

This invention relates to electrical instruments, and it has particular relation to alternating-current instruments of the induction type.

In certain induction instruments, a plurality of magnetic fluxes cooperate in an air gap to produce a shifting magnetic field. For example, in a watthour meter, voltage and current windings are employed to produce magnetic fluxes which may be referred to respectively as voltage and current fluxes. For accurate operation, it is desirable that these magnetic fluxes bear predetermined phase relationships to each other. In a conventional induction watthour meter, this phase relationship is such that at unity power factor of an alternating-current circuit associated with the watt-hour meter, the voltage and current fluxes are in quadrature.

Unless proper temperature compensation is provided, the desired phase relationship between voltage and current fluxes is not maintained over an adequate temperature range. The deviation in the phase relationship results from the temperature coefficients of the materials employed in the watthour meter. For example, the customary voltage windings and quadrature loops employed in watthour meters have positive temperature coefficients of resistance. Consequently, as the temperature to which a watthour meter is subjected rises, the resulting change in resistance of the voltage winding and quadrature loop of the watthour meter tends to decrease the phase angle between the voltage and current fluxes.

In watthour meters of a type having a voltage magnetic core positioned in a plane at right angles to the plane of a current magnetic core, suitable temperature compensation has been provided by disposing a quadrature loop in a slot formed in the voltage pole adjacent the voltage pole face. This slot was closed by a strip of material having a negative temperature coefficient of permeability.

In the modern watthour meter, the entire magnetic core is disposed in a single plane. Because of space limitations, and to avoid impairment in efficiency, it has been found impracticable to employ the slotted construction referred to in the preceding paragraph. For this reason, it has been proposed in the prior art to employ a separate magnetic circuit having a negative temperature coefficient of permeability for the lag loop. Such a construction is less desirable because of its decreased rigidity and its decreased simplicity of construction.

In accordance with the invention, a modern magnetic core for instruments of the watthour meter type is provided with a pair of slots which are symmetrically disposed relative to the potential pole of the magnetic core. Preferably the slots are disposed in spaced magnetic extensions positioned on opposite sides of the voltage pole. In such a construction, a quadrature loop has portions disposed in the slots. The slots then may be closed with magnetic keys or wedges having a negative temperature coefficient of permeability.

In a further embodiment of the invention, a pair of quadrature loops each has a portion disposed in a separate slot provided in the voltage pole of a magnetic core. Each of the slots is closed by a magnetic wedge or key having a negative temperature coefficient of permeability. The slots and loops are symmetrically disposed relative to the voltage pole.

If further compensation control is desired, extensions of the quadrature loops or auxiliary quadrature loops may be positioned to embrace current flux. Such auxiliary loops may be adjustable for adjusting the phase angle between current and voltage fluxes. Alternatively, adjustment of the phase angle may be effected by moving the magnetic keys or wedges relative to the magnetic core.

It is, therefore, an object of the invention to provide an induction instrument of the type employing a plurality of magnetic fluxes with improved means for maintaining a predetermined phase relationship between the magnetic fluxes.

It is a further object of the invention to provide a watthour meter core having slotted magnetic extensions adjacent opposite sides of the voltage pole within which a quadrature loop is held by magnetic wedges or keys having a negative temperature coefficient of permeability.

It is another object of the invention to provide a watthour meter magnetic core having a pair of slots symmetrically disposed relative to the voltage pole and having a separate quadrature loop held in each of the slots by magnetic means having a negative temperature coefficient of permeability.

It is a still further object of the invention to provide a watthour meter magnetic core including a quadrature loop provided with a local magnetic path having a negative temperature coefficient of permeability, the watthour meter core also including adjusting means for adjusting the phase angle relationship of voltage and current fluxes.

Other objects of the invention will be apparent from the following description, taken in conjunction with the accompanying drawings, in which:

Figure 1 is a view in front elevation, with parts broken away, of a watthour meter embodying the invention;

Fig. 2 is a detailed view taken along the line II—II of Fig. 1;

Fig. 3 is a view in front elevation, with parts broken away, of a watthour meter embodying a modified form of the invention;

Fig. 4 is a view in front elevation, with parts broken away, of a watthour meter showing a still further modification of the invention;

Fig. 5 is a view in top plan of quadrature loops suitable for the watthour meter of Fig. 4;

Fig. 6 is a view in front elevation, with parts broken away, of a watthour meter illustrating another modification of the invention;

Fig. 7 is a view in top plan of quadrature loops suitable for the watthour meter of Fig. 6; and Fig. 8 is a view in side elevation of an adjusting mechanism suitable for the watthour meters of Figs. 1, 3, 4 and 6.

Referring to the drawings, Fig. 1 shows an induction type alternating-current instrument, which may be assumed to be a watthour meter. This meter includes a magnetic core 1 provided with a voltage pole 2 and current poles 3 and 4. These poles 2, 3 and 4 are spaced to define an air gap within which an electro-conductive disc or armature 5 is mounted for rotation. The poles are provided, respectively, with a voltage winding 6 and current windings 7 and 8. As well understood in the art, when the windings are energized respectively in accordance with the voltage and current of an alternating-current circuit, a shifting magnetic field is set up in the air gap. Under the influence of this magnetic field, the armature 5 rotates. A damping magnet (not shown) conventionally is employed for controlling the rate of rotation of the armature 5. A conventional overload shunt S is shown between the current poles 3 and 4 for providing overload compensation for the meter.

Accurate operation of the watthour meter depends upon the establishment of a predetermined phase relationship between voltage and current magnetic fluxes produced by the windings 6, 7 and 8. In conventional watthour meters, the desired relationship is such that at unity power factor of the associated alternating-current circuit; the voltage and current fluxes are in quadrature.

The quadrature relationship between voltage and current fluxes is established in part by the high inductance of the voltage winding 6 which contains a large number of turns of conductor. In order to establish a high uniform inductance for the voltage winding 6, it is the practice to divert a substantial portion of the flux produced by the winding through a fixed magnetic path. In Fig. 1 this magnetic path is established by magnetic members 9 and 10 which project from the sides of the magnetic core 1 towards opposite sides of the voltage pole 2. The magnetic members 9 and 10 are spaced from the voltage pole by small air gaps. The magnetic members 9 and 10 also carry depending auxiliary poles 11 and 12 which are positioned to carry a portion of the current flux.

Although the voltage winding 6 has a high inductance, current passing therethrough is not exactly in quadrature with the applied voltage for the reason that the voltage winding has some resistance. To establish an exact quadrature relationship between voltage and current fluxes, a quadrature loop 13 of electro-conductive material is positioned to enclose that portion of the voltage flux which passes through the air gap of the meter. The lagging effect produced by the quadrature loop 13 may be proportioned to bring the current and voltage fluxes in the air gap exactly in quadrature at a predetermined temperature.

To receive the quadrature loop 13, the magnetic members 9 and 10 are provided with two slots 14 and 15 which are symmetrically disposed relative to the voltage pole 2. A portion of the quadrature loop 13 is positioned in each of the slots and is fastened securely in place by means of a magnetic wedge or key 16 or 17. By inspection of Fig. 1 it will be observed that the wedges or keys have parts interlocking with the walls of the slots.

As previously pointed out, the temperature coefficients of the materials employed in a watthour meter tend to change the phase relationship between voltage and current fluxes as the temperature varies. For example, the voltage winding 6 generally is formed of copper conductor, which has a substantial positive temperature coefficient of resistance. Also the quadrature loop 13 generally is formed of copper or bronze and also possesses a positive temperature coefficient of resistance. For this reason, the phase angle between current and voltage fluxes tends to decrease as the temperature of the watthour meter increases. For accurate operation of the watthour meter, it is desirable that the phase angle be substantially independent of temperature.

To compensate the watthour meter for phase angle errors introduced by changes in temperature thereof, one or more local magnetic paths for magnetic flux produced by current passing through the quadrature loop 13 are provided. These paths are designed to have a negative temperature coefficient of permeability. In the watthour meter illustrated in Fig. 1, such paths may be established by forming the magnetic wedges or keys 16 and 17 of a magnetic material having a negative temperature coefficient of permeability. Such materials are well known in the art and generally comprise a nickel-iron or nickel-copper alloy containing approximately 30% nickel and suitably heat treated. The construction illustrated in Fig. 1 requires a minimum of parts and assures a rigid positioning of the quadrature loop 13. Moreover, the symmetrical relationship of the slots and magnetic wedges or keys maintains the balance of the magnetic parts of the magnetic structure.

It is believed that the operation of the structure thus far described is apparent from the foregoing description. As previously pointed out, an increase in temperature of the watthour meter modifies the properties of certain components thereof to decrease the phase angle between current and voltage fluxes. At the same time, the increase in temperature operates to decrease the magnetic permeability of the wedges or keys 16 and 17. The reduction in permeability of the wedges or keys in turn increases the reluctance of the magnetic paths offered to current flowing through the quadrature loop 13. The resulting decrease in inductance of the loop 13 permits more current to flow therethrough. By proper proportioning of the quadrature loop 13 and the magnetic keys or wedges 16 and 17, the increase in current flow through the loop as the temperature of the watthour meter rises, may be proportioned to maintain a predetermined phase relationship between the voltage and current magnetic fluxes.

The quadrature loop 13 may be formed of one or more turns of conductor. As a specific example, the loop 13 may be formed of a single closed punching of copper or bronze.

Although the quadrature loop 13 alone may be proportioned to provide the desired control of the phase relationship between voltage and current fluxes, in some cases an additional control is desirable. Such additional control may be provided by auxiliary quadrature loops 18 and 19 which surround portions of the current flux. Conveniently, the auxiliary quadrature loops 18 and 19 may be positioned around the depending auxiliary poles 11 and 12 to enclose current flux passing therethrough. With such an arrangement, the quadrature loop 13 may be designed to overlag slightly the watthour meter. The auxiliary lag loops 18 and 19 then are proportioned to lag the current flux sufficiently to establish the desired phase relationship between current and voltage fluxes. A more detailed description of the lagging of both current and voltage fluxes may be found by reference to the Oman Patent 1,764,339.

Because of slight variations in the inherent characteristics of materials and because of manufacturing tolerances, it is desirable that a convenient adjustment be provided for establishing correct phase relationship between current and voltage fluxes. As hereinafter pointed out, such adjustment may be effected by movement of the magnetic wedges or keys 16 and 17 relative to the magnetic structure 1. Alternately, adjustments may be provided by varying the impedance of the quadrature loop 13 or of the auxiliary quadrature loops 18 and 19.

As a specific example of a suitable phase adjustment, the auxiliary quadrature loops may be formed of a winding having leads 20 and 21 (Fig. 2) which are connected together in any suitable manner, as by soldering, to complete the closure of the winding. By shortening the leads 20 or 21, or by lengthening the leads 20 and 21, the resistance of the auxiliary loops may be varied slightly to adjust the phase angle.

Since the compensation thus far described requires no parts on the current poles 3 and 4 the high insulation required for parts on the current poles is avoided.

The phase angle control illustrated in Fig. 1 also may be applied to a watthour meter of the type wherein all poles are positioned on the same side of the armature 5. Such a watthour meter is illustrated in Fig. 3, wherein a magnetic structure 31 is provided with a voltage pole 32 and current poles 33 and 34. It will be observed that the voltage pole 32 is split to form auxiliary current poles 33a and 34a. A voltage winding 36 surrounds the voltage pole and current windings 37 and 38 surround the current poles. The magnetic structure 31 also has a portion 39 spaced from the poles 32, 33 and 34 to establish an air gap within which the armature 5 is mounted for rotation. Such a magnetic structure is well known in the art.

In order to control the phase angle between current and voltage fluxes of the watthour meter illustrated in Fig. 3, the magnetic portion 39 is provided with slots 44 and 45 for receiving the quadrature loop 13 and the magnetic keys 16 and 17. If additional control is required, the portion 39 may be provided with additional slots for receiving the auxiliary quadrature loops 18 and 19. Since the construction and operation of the quadrature loop 13, keys 16 and 17, and auxiliary quadrature loops 18 and 19 are similar to the construction and operation thereof as described with reference to Fig. 1, a further description of Fig. 3 appears unnecessary.

In Fig. 4, a watthour meter is illustrated which includes a magnetic structure 51, a voltage pole 52, current poles 53 and 54, a voltage winding 56 and current windings 57 and 58. The voltage pole 52 is provided with a pair of slots 64 and 65 for receiving portions of quadrature loops 63 and 63a. Except for the position of the slots 64 and 65, the magnetic structure illustrated in Fig. 4 resembles that of Fig. 1.

Each of the quadrature loops 63 and 63a has a portion 68 or 68a positioned in one of the slots 64 and 65, and a portion 69 or 69a extending around a portion of the voltage pole. The slots are closed by magnetic wedges or keys 66 and 67, which correspond to the keys or wedges 16 and 17 of Fig. 1, and which are formed of similar materials. The quadrature loops are illustrated equidistant from the axis of the armature 5, and spaced apart in the direction of movement of the armature 5 adjacent the poles.

In order to assure efficient operation of the magnetic structure 51, the slots 64 and 65 preferably are spaced inwardly from the sides of the voltage pole by a substantial distance. Despite this spacing of the slots 64 and 65, a substantial amount of voltage flux is controlled for the reason that two quadrature loops are provided. Moreover, because of the symmetrical positioning of the slots 64 and 65, and of the loops 63 and 63a relative to the voltage pole 52, the balance of the magnetic structure is not disturbed. It will be observed that the portions 68 and 68a of the quadrature loops extend substantially at right angles to the plane of the loops. This permits the adoption of narrow elongated slots 64 and 65 and keys 66 and 67 of small diameter. With such a construction, the cross-section of material removed from the voltage pole face is kept at a minimum. At the same time, sufficient current capacity is assured for the portions 68 and 68a.

If desired, the quadrature loops 63 and 63a may be extended to provide auxiliary portions 70 and 70a which surround the depending auxiliary poles 72 and 73 of the magnetic structure 51. These auxiliary portions 70 and 70a serve to lag current flux in a manner analogous to the operation of the auxiliary loops 18 and 19 of Fig. 1.

It will be observed that each of the quadrature loops 63 and 63a has a local magnetic path completed by the key 66 or 67 which has a negative temperature coefficient of permeability. Since the operation of the structure thus far described in Fig. 4 resembles that of Fig. 1, a further discussion thereof appears unnecessary.

In order to adjust the phase relationship of current and voltage fluxes, the watthour meter of Fig. 4 may be provided with a closed winding 75 which has turns surrounding the current poles 53 and 54. By inspection of Fig. 4, it will be noted that the turn surrounding the current pole 53 is reversely wound with respect to the turn surrounding the current pole 54. Consequently, the winding 75 which may be termed a "figure of eight" winding, serves to lag the current flux. The ends 76 and 77 of this winding may be connected by solder. By varying the length of the winding, the resistance thereof may be modified to adjust the phase relationship between the voltage and current fluxes of the watthour meter shown in Fig. 4. This adjustment corresponds to the adjustment of the leads 20 and 21 of Fig. 2.

In Fig. 6, a magnetic structure 81 for a watthour meter is provided with a voltage pole 82. This magnetic structure is similar to the magnetic structure 51 of Fig. 4, except for a slight modification of the voltage pole 82 to permit the employment of a single magnetic wedge or key 83 which is formed of a material having a negative temperature coefficient of permeability. The voltage pole 82 contains two slots 84 and 85 which correspond to the slots 64 and 65 of Fig. 4. Each of the slots 84 and 85 is provided with a quadrature loop 86 or 86a. These loops correspond to the portion 69 and 69a of the quadrature loops 63 and 63a of Fig. 4. It will be noted, however, that the quadrature loops 86 and 86a are not provided with auxiliary projections to embrace portions of the current flux, although such projections could be employed if desired. Since the operation of the structure shown in Fig. 6 is apparent from the discussion of Figs. 1 and 4, a detailed description of Fig. 6 appears unnecessary.

In Fig. 6 a somewhat modified adjustment for the phase relationship between current and voltage fluxes is disclosed. This adjustment includes a winding 87 which surrounds the portion 88 of the voltage pole which lies between the two slots 84 and 85. By inspection of Fig. 6, it will be noted that the portion 88 constitutes a common part of the local magnetic paths established for magnetic flux produced by current flowing through the quadrature loops 86 and 86a. Consequently, a variation in impedance of the winding 87 effects the control exercised by the quadrature loops 86 and 86a on the voltage flux. Such a variation in impedance may be effected by varying the lengths of the leads of the winding 87. The leads may be soldered together at a point establishing the proper phase relationship between current and voltage fluxes of the watthour meter of Fig. 6. Although the winding 87 operates directly as a quadrature loop on a small proportion of the voltage flux passing therethrough, its principal effect is determined by the magnetic flux produced by current flowing in the lag loops 86 and 86a.

As previously pointed out, an adjustment for the phase relationship between current and voltage fluxes of a watthour meter may be effected by varying the position of the magnetic key or wedge relative to the magnetic structure of the watthour meter. Such an adjustment is illustrated in Fig. 8. In Fig. 8, a magnetic structure 91 is illustrated which may correspond to magnetic structure 1, 51 or 81 of Figs. 1, 4 and 6. This magnetic magnetic structure 91 is provided with a quadrature loop 92 which corresponds to the quadrature loop 13 of Fig. 1, one of the quadrature loops 63 or 63a of Fig. 4, or one of the quadrature loops 86 or 86a of Fig. 6. A local magnetic path for magnetic flux produced by current flowing through the quadrature loop 92 is completed by a magnetic key or wedge 93 which corresponds to one of the magnetic keys or wedges 16, 17, 66, 67 or 83 of Figs. 1, 4 and 6 with the addition thereto of a flange for receiving an adjusting screw.

The magnetic wedge or key 93 may be moved with respect to the magnetic structure 91 by means of an adjusting screw 94 which is received in a threaded opening provided in a flange 95 carried by the magnetic key or wedge 93. One end of the adjusting screw 94 is reduced in diameter to form a pin 96 which extends through an opening in a collar 97. The end of the pin 96 is upset to form a head 98, permitting rotation of the screw 94 relative to the collar 97 but preventing axial movement of the screw 94 relative to the collar. The collar 97 is rigidly attached with respect to the magnetic structure 91 in any suitable manner. Consequently, by rotation of the screw 94, the magnetic key or wedge 93 is moved with respect to the magnetic structure 91. Since movement of the magnetic key or wedge 93 modifies the reluctance of the local magnetic path for the quadrature loop 92, the screw 94 may be operated to adjust the phase relationship between current and voltage fluxes in the magnetic structure 91.

Although the invention has been described with reference to certain specific embodiments thereof, numerous modifications thereof are possible. Therefore, the invention is to be restricted only by the appended claims.

I claim as my invention:

1. In an alternating-current measuring instrument having parts subject to temperature variation, a magnetic structure including a voltage pole and current poles spaced to define an air gap, an electroconductive armature positioned in said air gap for rotation, means associated with said magnetic structure for producing a shifting magnetic field in said air gap, said means comprising a voltage winding for producing a first magnetic flux in said voltage pole and said air gap, and current windings for producing a second magnetic flux in said current poles and said air gap, and means for establishing a predetermined phase relationship between said magnetic fluxes, said last-named means comprising a plurality of electroconductive loops each positioned adjacent the air gap face of said voltage pole for surrounding a separate portion of said first magnetic flux passing through said voltage pole, said loops being spaced in the direction of movement of said armature substantially symmetrically relative to said voltage pole face, and temperature responsive means for maintaining said phase relationship over a substantial temperature range, said temperature responsive means including means establishing a magnetic path for magnetic flux produced by current flowing in said loops, said magnetic path having a negative temperature coefficient of permeability.

2. In an alternating-current measuring instrument having parts subject to temperature variation, a magnetic structure including a voltage pole and current poles spaced to define an air gap, an electroconductive armature positioned in said air gap for rotation, means associated with said magnetic structure for producing a shifting magnetic field in said air gap, said means comprising a voltage winding for producing a first magnetic flux in said voltage pole and said air gap, and current windings for producing a second magnetic flux in said current poles and said air gap, the face of said voltage pole bordering said air gap having a plurality of slots therein extending across said face in a direction substantially transverse to the direction of movement of said armature adjacent said face, and said slots being substantially symmetrical relative to said face, and means for establishing a predetermined phase relationship between said magnetic fluxes, said last-named means comprising a plurality of electroconductive loops each surrounding a separate portion of said first magnetic flux, and each having a portion positioned in a separate one of said slots, said loops being substantially symmetrically disposed relative to said voltage pole face; and temperature responsive means for maintaining said phase relationship over a substantial temperature range, said temperature responsive means including magnetic means having a negative temperature coefficient of permeability closing said slots.

3. In an alternating-current measuring instrument having parts subject to temperature variations, a magnetic structure having an air gap, means associated with said magnetic structure for producing a shifting magnetic field in said air gap, said means including voltage responsive means for producing a first magnetic flux in said air gap, and current responsive means for producing a second magnetic flux in said air gap, and means for establishing a predetermined phase relationship between said first and second magnetic fluxes, said last-named means comprising closed electroconductive means surrounding at least part of one of said magnetic fluxes for establishing said predetermined phase relationship, means directing magnetic flux produced by current flowing in said closed electroconductive means through said magnetic structure, said last-named means comprising magnetic means having a negative temperature coefficient of permeability for maintaining said predetermined phase relationship over a substantial temperature range, and means for adjusting said magnetic means relative to said magnetic structure to vary the magnetic path offered to magnetic flux produced by current flowing in said closed electroconductive means.

4. In an alternating-current measuring instrument having parts subject to temperature variations, a magnetic structure having an air gap, means associated with said magnetic structure for producing a shifting magnetic field in said air gap, said means including voltage responsive means for producing a first magnetic flux in said air gap, and current responsive means for producing a second magnetic flux in said air gap, and means for establishing a predetermined phase relationship between said first and second magnetic fluxes, said last-named means comprising closed electroconductive means surrounding at least part of one of said magnetic fluxes for establishing said predetermined phase relationship, means directing magnetic flux produced by current flowing in said closed electroconductive means through said magnetic structure, said last-named means comprising magnetic means having a negative temperature coefficient of permeability for maintaining said predetermined phase relationship over a substantial temperature range, and an auxiliary electroconductive loop surrounding magnetic flux produced by current flowing in said electroconductive means.

5. In an alternating-current measuring instrument having parts subject to temperature variation, a magnetic structure including a voltage pole and current poles spaced to define an air gap and disposed in a common plane and electroconductive armature positioned in said air gap for rotation, means associated with said magnetic structure for producing a shifting magnetic field in said air gap, said means comprising a voltage winding for producing a first magnetic flux in said voltage pole and said air gap, and current windings for producing a second magnetic flux in said current poles and said air gap, and means for establishing a predetermined phase relationship between said magnetic fluxes, said last-named means comprising a plurality of electroconductive loops each positioned adjacent the air gap face of said voltage pole for surrounding a separate portion of said first magnetic flux, said loops being spaced in the direction of movement of said armature substantially symmetrically relative to said voltage pole face, and temperature responsive means for maintaining said phase relationship over a substantial temperature range, said temperature responsive means including means establishing a magnetic path for magnetic flux produced by current flowing in said loops, said magnetic path having a negative temperature coefficient of permeability, and an auxiliary electroconductive loop surrounding said magnetic path, said auxiliary electroconductive loop being adjustable to vary the effective ampere turns thereof.

6. In an alternating-current measuring instrument having parts subject to temperature variation, a magnetic structure including a voltage pole and current poles spaced to define an air gap, an electroconductive armature positioned in said air gap for rotation, means associated with said magnetic structure for producing a shifting magnetic field in said air gap, said means comprising a voltage winding for producing a first magnetic flux in said voltage pole and said air gap, and current windings for producing a second magnetic flux in said current poles and said air gap, means establishing auxiliary paths for a portion of the magnetic flux produced by said voltage winding, said last-named means including a plurality of magnetic members on said magnetic structure terminating adjacent said voltage pole, and means for establishing a predetermined phase relationship between said first and second magnetic fluxes over a substantial temperature range, said last-named means comprising an electroconductive loop surrounding said first-named magnetic flux, said electroconductive loop having portions adjacent said magnetic members, and magnetic means having a negative temperature coefficient of permeability cooperating with said magnetic members to define a path for magnetic flux produced by current flowing in said loop.

7. In an alternating-current measuring instrument having parts subject to temperature variation, a magnetic structure including a voltage pole and current poles spaced to define an air gap, an electroconductive armature positioned in said air gap for rotation, means associated with said magnetic structure for producing a shifting magnetic field in said air gap, said means comprising a voltage winding for producing a first magnetic flux in said voltage pole and said air gap, and current windings for producing a second magnetic flux in said current poles and said air gap, means including slotted magnetic members on said magnetic structure terminating adjacent opposite sides of said voltage pole for establishing auxiliary paths for a portion of the magnetic flux produced by said voltage winding, and means for establishing a predetermined phase relationship between said first and second magnetic fluxes over a substantial temperature range, said last-named means comprising an electroconductive loop surrounding said first-named magnetic flux adjacent said air gap, said loop having portions positioned in the slots of said slotted magnetic members, and magnetic means having a negative temperature coefficient of permeability closing said slots.

8. In an alternating-current measuring instrument having parts subject to temperature variation, a magnetic structure including a voltage pole and current poles spaced to define an air gap, an electroconductive armature positioned in said air gap for rotation, means associated with said magnetic structure for producing a shifting magnetic field in said air gap, said means comprising a voltage winding for producing a first magnetic flux in said voltage pole and said air gap, and current windings for producing a second magnetic flux in said current poles and said air gap, means including slotted magnetic members on said magnetic structure terminating adjacent opposite sides of said voltage pole for establishing auxiliary paths for a portion of the magnetic flux produced by said voltage winding, said slotted magnetic members being positioned in the path of at least a portion of said second magnetic flux, and means for establishing a predetermined phase relationship between said first and second magnetic fluxes over a substantial temperature range, said last-named means comprising an electroconductive loop surrounding said first-named mangetic flux adjacent said air gap, said loop having portions positioned in the slots of said slotted magnetic members, and magnetic means having a negative temperature coefficient of permeability closing said slots, and adjustable electroconductive loop means surrounding the portion of said second magnetic flux which passes through said magnetic members.

9. In an alternating-current measuring instrument having parts subject to temperature variation, a magnetic structure including a voltage pole and current poles spaced to define an air gap, an electroconductive armature positioned in said air gap for rotation, means associated with said magnetic structure for producing a shifting magnetic field in said air gap, said means comprising a voltage winding for producing a first magnetic flux in said voltage pole and said air gap, and current windings for producing a second magnetic flux in said current poles and said air gap, means including magnetic members on said magnetic structure terminating adjacent said air gap for establishing auxiliary magnetic paths for a portion of magnetic fluxes produced by said voltage and current windings, and means for establishing a predetermined phase relationship between said first and second magnetic fluxes over a substantial temperature range, said last-named means comprising an electroconductive loop surrounding said first magnetic flux adjacent said air gap, means establishing a magnetic path having a negative temperature coefficient of permeability for magnetic flux produced by current flowing in said loop, said magnetic path including portions of said magnetic members, and auxiliary electroconductive loop means surrounding at least a portion of the magnetic flux passing through said magnetic members.

10. In an alternating-current measuring instrument having parts subject to temperature variation, a magnetic structure having an air gap, an electroconductive armature mounted for rotation in said air gap, said magnetic structure including a voltage pole and current poles positioned on a first side of said armature, and including a magnetic member positioned on a second side of said armature and coacting with said voltage and current poles to define said air gap, means for producing a shifting magnetic field in said air gap, said means including a voltage winding for producing a first magnetic flux in said voltage pole and said air gap, and current windings for producing a second magnetic flux in said current poles and said air gap, and means for maintaining a predetermined phase relationship between said magnetic fluxes over a substantial temperature range, comprising an electroconductive loop positioned adjacent said magnetic member for embracing a portion of said magnetic fluxes, and means establishing a magnetic path having a negative temperature coefficient of permeability for magnetic flux produced by current flowing in said loop, said magnetic path including a portion of said magnetic member.

11. In an alternating-current measuring instrument having parts subject to temperature variation, a magnetic structure having an air gap, an electroconductive armature mounted for rotation in said air gap, said magnetic structure including a voltage pole and current poles positioned on a first side of said armature, and including a slotted magnetic member positioned on a second side of said armature and coacting with said voltage and current poles to define said air gap, means for producing a shifting magnetic field in said air gap, said means including a voltage winding for producing a first magnetic flux in said voltage pole and said air gap, and current windings for producing a second magnetic flux in said current poles and said air gap, and means for maintaining a predetermined phase relationship between said magnetic fluxes over a substantial temperature range, comprising an electroconductive loop positioned adjacent said magnetic member for embracing at least a portion of said first magnetic flux, said loop having parts embedded in the slots of said magnetic member, magnetic means having a negative temperature coefficient of permeability closing said slots, said magnetic means cooperating with said magnetic member to provide a magnetic path for magnetic flux produced by current flowing in said loop, and auxiliary electroconductive loop means positioned to embrace at least a portion of said second magnetic flux.

12. In an alternating current instrument having parts subject to temperature variation, a magnetic structure disposed in a single plane, said magnetic structure having an air gap and having a voltage pole and current pole means adjacent said air gap, means associated with said voltage pole and current pole means for producing therein respectively a first magnetic flux and a second magnetic flux acting to establish a shifting magnetic field in said air gap, and means for maintaining a predetermined phase relationship between said magnetic fluxes, said last-named means comprising closed electroconductive means positioned to embrace at least part of said first magnetic flux and part of said second flux, said electroconductive means having portions symmetrically disposed with respect to said voltage pole, and temperature responsive means positioned to form with said magnetic structure a magnetic path for magnetic flux produced by current flowing in each of said portions of said electroconductive means for maintaining said phase relationship over a substantial range of temperature.

13. In an alternating current instrument having parts subject to temperature variation, a magnetic structure disposed in a single plane, said magnetic structure having an air gap and having a voltage pole and current pole means adjacent said air gap, said magnetic structure including magnetic means symmetrically disposed with respect to said voltage pole for receiving magnetic flux leaving said voltage pole, means associated with said voltage pole and current pole means for producing therein respectively a first magnetic flux and a second magnetic flux acting to establish a shifting magnetic field in said air gap, an electroconductive armature mounted for rotation in said air gap in response to said shifting magnetic field, said magnetic structure having a pair of slots spaced angularly about the axis of rotation of said armature, said slots being symmetric with respect to said voltage pole, and means for maintaining a predetermined phase relationship between said first and second magnetic fluxes, said last-named means comprising closed electroconductive means embracing and lagging at least part of said first magnetic flux and part of said second magnetic flux, said electroconductive means having portions positioned in said slots, and magnetic means having a negative temperature coefficient of permeability bridging said slots to establish with said magnetic structure a local magnetic path for magnetic flux produced by current flowing in each of said portions of said electroconductive means, said magnetic means being proportioned with said electroconductive means to maintain said phase relationship over a substantial temperature range.

14. In an alternating current instrument having parts subject to temperature variations, a magnetic structure disposed in a single plane, said magnetic structure having an air gap and having a voltage pole and current pole means adjacent said air gap, said magnetic structure including magnetic means symmetrically disposed with respect to said voltage pole for receiving magnetic flux leaving said voltage pole, means associated with said voltage pole and current pole means for producing therein respectively a first magnetic flux and a second magnetic flux acting to establish a shifting magnetic field in said air gap, an electroconductive armature mounted for rotation in said air gap in response to said shifting magnetic field, said magnetic structure having a pair of slots spaced angularly about the axis of rotation of said armature, said slots being symmetric with respect to said voltage pole, and means for maintaining a predetermined phase relationship between said first and second magnetic fluxes, said last-named means comprising closed electroconductive means embracing and lagging at least part of said first magnetic flux and part of said second magnetic flux, said electroconductive means having portions positioned in said slots, and magnetic wedge means having a negative temperature coefficient of permeability wedged in said slots over the portions of said electroconductive means positioned therein to retain said electroconductive means in said slots and to establish with said magnetic structure a local magnetic path for magnetic flux produced by current flowing in each of said portions of said electroconductive means, said magnetic means being proportioned with said electroconductive means to maintain said phase relationship over a substantial temperature range.

15. In an alternating current instrument having parts subject to variation in electrical and magnetic properties in response to variations in temperature, a magnetic structure having an air gap and having current pole means and only one voltage pole adjacent said air gap, means associated with said voltage pole and current pole means for producing therein respectively a first magnetic flux and a second magnetic flux to establish a shifting magnetic field in said air gap, and means for maintaining a predetermined phase relationship between said magnetic fluxes, said last-named means comprising a current-carrying closed electroconductive means positioned to embrace at least part of said first magnetic flux, said electroconductive means having a current-carrying portion positioned adjacent a portion of said magnetic core other than said voltage pole, and temperature responsive magnetic means forming with said portion of said magnetic core a magnetic path for magnetic flux produced by current flowing in said electroconductive means.

16. In an alternating current instrument having parts subject to variation in electrical and magnetic properties in response to variations in temperature, a magnetic structure having an air gap and having current pole means and only one voltage pole adjacent said air gap, means associated with said voltage pole and current pole means for producing therein respectively a first magnetic flux and a second magnetic flux to establish a shifting magnetic field in said air gap, and means for maintaining a predetermined phase relationship between said magnetic fluxes, said last-named means comprising a closed electroconductive winding positioned to embrace at least part of said first magnetic flux, said electroconductive winding having portions symmetrically disposed with respect to said voltage pole, said portions being adjacent portions of said magnetic core other than said voltage pole, and magnetic material having a negative temperature coefficient of permeability forming with each of said portions of said magnetic core a magnetic path for magnetic flux produced by current flowing in said electroconductive winding.

17. In an alternating current measuring instrument, a magnetic structure including voltage pole means and current pole means spaced to define an air gap, an electroconductive armature positioned in said air gap for rotation, means associated with said magnetic structure for producing a shifting magnetic field in said air gap, said last-named means comprising voltage winding means for producing a first magnetic flux in said voltage pole means and said air gap, and current winding means for producing a second magnetic flux in said current pole means and said air gap, and means for establishing a predetermined phase relationship between said first and second magnetic fluxes, said last-named means comprising a unitary member formed of material having good electrical conductivity, said unitary member having a first portion positioned to embrace and lag said first magnetic flux and having a second portion positioned to embrace and lag said second magnetic flux.

THOMAS D. BARNES.